(12) United States Patent
O'Donnell

(10) Patent No.: US 8,462,301 B2
(45) Date of Patent: Jun. 11, 2013

(54) HIGH-STRENGTH OPTICAL BONDING METHOD USING OPTICAL SILICONE AS A BONDING MEDIUM AND PRESSURE SENSITIVE ADHESIVE AS AN INTERMEDIATE LAYER

(76) Inventor: Stephen Derby O'Donnell, Portland, OR (US)

( * ) Notice: Subject to any disclaimer, the term of this patent is extended or adjusted under 35 U.S.C. 154(b) by 0 days.

(21) Appl. No.: 11/337,042

(22) Filed: Jan. 19, 2006

(65) Prior Publication Data

US 2006/0159867 A1    Jul. 20, 2006

Related U.S. Application Data

(60) Provisional application No. 60/645,364, filed on Jan. 19, 2005.

(51) Int. Cl.
*G02F 1/1333*    (2006.01)

(52) U.S. Cl.
USPC ............................................. 349/122; 349/58

(58) Field of Classification Search
None
See application file for complete search history.

(56) References Cited

U.S. PATENT DOCUMENTS

| 6,369,865 B2 * | 4/2002 | Hinata ........................... 349/12 |
| 2004/0134233 A1 * | 7/2004 | Duffy et al. .................... 65/60.2 |
| 2005/0083465 A1 * | 4/2005 | Niiyama et al. ............... 349/122 |
| 2005/0285991 A1 * | 12/2005 | Yamazaki ....................... 349/58 |

* cited by examiner

*Primary Examiner* — Richard Kim
(74) *Attorney, Agent, or Firm* — Klarquist Sparkman, LLP

(57) ABSTRACT

A method of bonding an optical cover panel to an information display device through the use of intermediate layers of optical pressure-sensitive adhesive film which adheres to both optical silicone bonding medium and polymer plastic, and structures formed thereby.

11 Claims, 4 Drawing Sheets

HIGH-STRENGTH OPTICAL BONDING METHOD USING OPTICAL SILICONE AS A BONDING MEDIUM AND PRESSURE SENSITIVE ADHESIVE AS AN INTERMEDIATE LAYER

CROSS-REFERENCE TO RELATED APPLICATIONS

This application claims the benefit of the earlier filed U.S. provisional application entitled, "High-Strength Optical Bonding Method Using Optical Silicone As A Bonding Medium And Pressure Sensitive Adhesive As An Intermediate Layer", Application No. 60/645,364, filed 19 Jan. 2005.

FIELD OF THE INVENTION

This invention relates to an adhesive bond between polymer plastic and optical silicone bonding medium, and more particularly to the use of an intermediate adhesive layer to facilitate a high-strength, optical bond for an information display panel.

BACKGROUND

Information display devices are frequently used in harsh, hazardous, or extreme environments including marine, avionics, and industrial applications. In these harsh environments, the information display device is subjected to shock, vibration, impacts, water, and other elements that adversely affect the performance of the display device and may cause complete malfunction of the display.

Information display devices may also be used in an environment of high ambient light, such as direct sunlight, which can make the display device difficult to view. The viewing performance of information display devices in high ambient light conditions can be improved by placing an anti-reflective ("AR") medium in front of the display device in order to attenuate the back-reflected ambient light. This anti-reflective medium typically takes the form of a rigid optical cover panel, or a touch screen made of glass or optically clear polymer plastic. A rigid optical cover panel of this form provides good scratch-resistance and protection from moisture and debris.

Several bonding processes have been created in order to attach a rigid optical cover panel to an information display device. One such process using epoxy cement provides sufficient bond strength, but lacks the necessary flexibility to allow different coefficients of thermal expansion between the rigid optical cover panel and the information display device. This typically results in mechanical stress within the assembly under temperature changes, imparting stress forces to the display device causing visual anomalies and luminance irregularities in the operating display. When subjected to a significant sudden thermal shock or repeated moderate thermal shocks, the adhesion of hardened epoxy can fail entirely, creating a permanent de-lamination of the assembly. Additionally, an epoxy bonding medium lacks the ability to absorb or dampen mechanical shocks from the cover panel to the display device which can appear in the form of flashes of light or other anomalies on the display device.

Another bonding process, using urethane as the bonding medium, has the inherent and unacceptable characteristic of yellowing with age. Also, urethane bonding materials of optical quality are quite expensive.

Another bonding process, using silicone bonding media, is resistant to yellowing, and mixtures of optical silicones have been demonstrated to be sufficiently flexible and pliable to allow various coefficients of thermal expansion of the optical panel and the display device front surface without inducing stress to the display device, Additionally, a flexible silicone adhesive is able to dampen mechanical shock to the display device. However, using silicone as a bonding medium has the inherent problem that silicone does not adhere well to polymer plastic, particularly acrylic and polycarbonate forms of polymer plastic which are the two most common, optically-clear plastics. This is because the low surface energy of the polymer plastic provides only a very weak bond. When the silicone bond is subject to mechanical stress such as a shearing force due to differing rates of thermal expansion of glass and polymers, or twisting of the assembly, or shock and vibration then de-lamination is the normal result. Therefore, the use of a shatter-resistant polymer as a display cover plate has not been feasible when optically bonding to a display device. Glass, which has been traditionally used in place of polymer plastic as an optical cover panel is vulnerable to impacts and cracking.

Another bonding process includes the use of an adhesive gasket between an optical cover panel and the display device in place of an optical bond. This technique results in an air gap between the display device and the plastic cover panel. This air gap causes a severe optical refractive index mismatch which degrades the overall appearance of the display. Additionally, the air gap is prone to moisture condensation.

What is needed are high strength optical bonding methods for forming assemblies such as information display devices having polymer plastic front cover plates.

SUMMARY OF THE INVENTION

Briefly, adhesion of an optical silicone bonding medium to polymer plastic is substantially improved by using a layer of optically clear, acrylic or acrylate pressure-sensitive adhesive ("PSA") film. The PSA layer adheres with excellent strength to both the polymer plastic and to the optical silicone bonding medium.

In accordance with the present invention, a high-strength optical bond is provided for use in the attachment of an optical cover panel or touch panel switching device to an information display device front surface, comprised of an optical cover panel, to which a film of optical pressure-sensitive adhesive is attached, and a layer of optical silicone bonding medium which bonds to the front surface of an information display device and to the pressure sensitive optical adhesive film attached to the optical cover panel.

DETAILED DESCRIPTION

Figure 1:
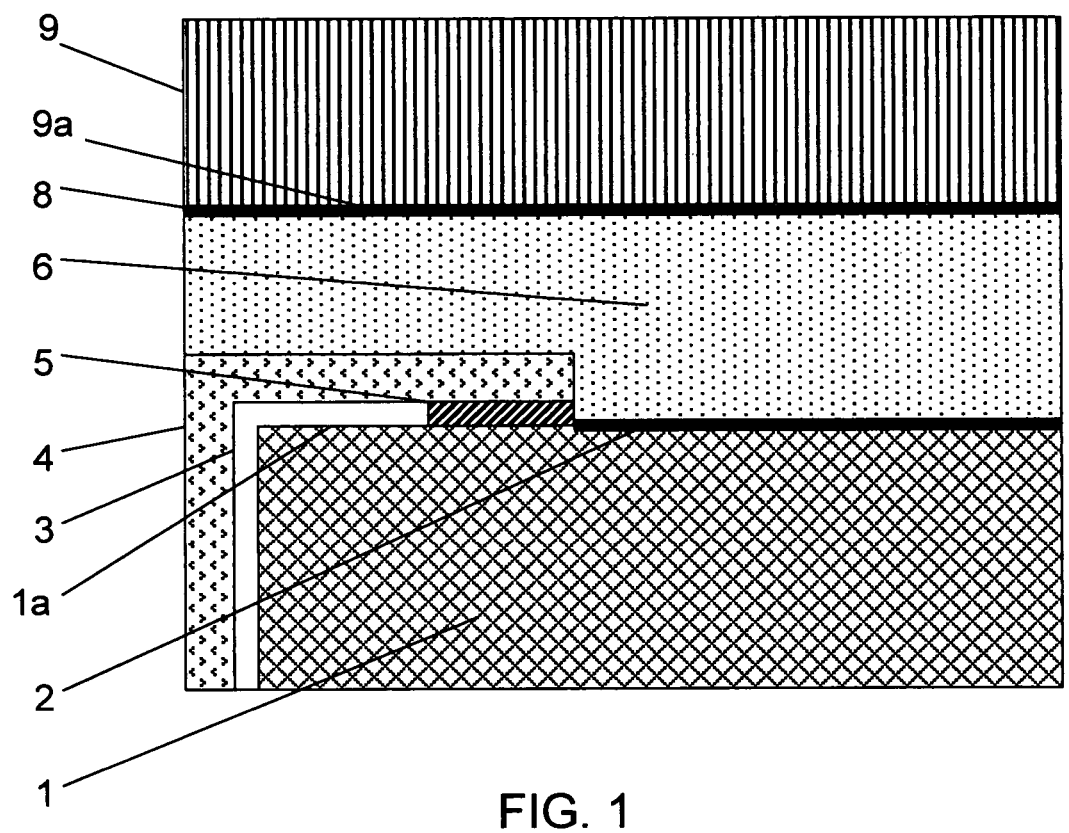
FIG. 1 is a cross sectional view of an illustrative embodiment of the present invention in which a first pressure sensitive adhesive layer is disposed between the front side surface of an information display device (i.e., the side on which the information is visible) and a silicone bonding medium, and a second pressure sensitive adhesive layer is disposed between the back side surface of a cover panel and the silicone bonding medium.

Generally, assemblies in accordance with the present invention include an information display device and a front cover wherein the front cover is attached to the information display device by a combination of a silicone bonding medium and at least one layer of a pressure sensitive adhesive layer. In accordance with the present invention, the pressure sensitive adhesive layer bonds well with both the silicone bonding medium and with other materials, such as, for example, a polymer plastic front cover panel.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Among other things, various embodiments of the present invention provide: an optical bond that is high-strength and can withstand mechanical stress without de-laminating; an optical bond that remains flexible and is able to withstand both mechanical shock and temperature; an optical bond that is optically stable and non-yellowing; an optical bond with improved adherence to a polycarbonate, acrylic, or other plastic optical cover panel; an optical bond with improved adherence to an information display device front surface; an optical bond that provides an optical coupling between the information display device and the optical cover plate without an air gap; and an improved liquid crystal display device which exhibits improved protection, improved optical characteristics, and simplicity of manufacture.

As noted above, various embodiments the present invention include materials and methods for effectively assembling displays having front covers that are superjacent an information display device, wherein both a silicone bonding medium and a pressure sensitive adhesive layer are disposed in contact with each other, and between the cover and the display device. Various details regarding these materials and methods are presented below.

With respect to the silicone bonding medium, it is noted that Platinum-catalyzed, also known as addition-cured elastomers, vinyl-terminated siloxanes, polymethylsiloxane or polydimethylsiloxane, such as GE Silicones 6136 or Dow 527, may be used.

With respect to the pressure sensitive adhesive layer, also referred to as transfer tapes or laminating adhesives, it is noted that these provide viscoelastic bonds, are acrylic derived or acrylate derived of acrylic copolymer or acrylate copolymer, manufactured by extrusion, solvent process, emulsion, or spray application, applied typically to a release liner (support surface) of thin sheet material such as polyethylene, polycarbonate, or polypropylene, and rolled as a tape, or provided between two release liners. A PSA can be applied directly to the intended substrate surface. The PSA is normally optically transparent, but can be dyed to function as a band pass filter or neutral density filter. Examples of commercially available optically transparent PSAs are 3M 8161 and Adhesives Research 8154. Optical PSAs are also provided applied to both sides of a thin transparent carrier such as polyester, then protected by release liners over the adhesives surfaces. Optical silicone-based PSAs are not suitable due to solubility in liquid silicone rubber (LSR). Other adhesive formulas lack optical clarity, or inhibit platinum silicone catalyzation, or out-gas, or do not have the necessary thermal range.

With respect to the application of a pressure sensitive adhesive layer, it is noted that flat surfaces such as a touch panel or plastic sheet are easily laminated with a motorized mechanical roll laminator. In view of the fragile nature of LCD column and row driver tabs at the perimeter of the LCD, application of a PSA to a front polarizer surface with a roll laminator requires very specialized and precise and costly systems. Application of a PSA to an LCD front surface is normally provided by a skilled craft hand-applied process, using a squeegee or roller to press the PSA to the surface while a protective liner is intact. Laminations of PSA films are benefited by post-lamination treatment in a dry autoclave, utilizing pressure and heat to eliminate trapped bubbles between the PSA and the substrate.

PSA material may also be deposited directly onto a substrate surface without the requirement of a liner. However, this process requires clean room conditions and usually robotic mechanisms to prevent contamination.

Figure 4:
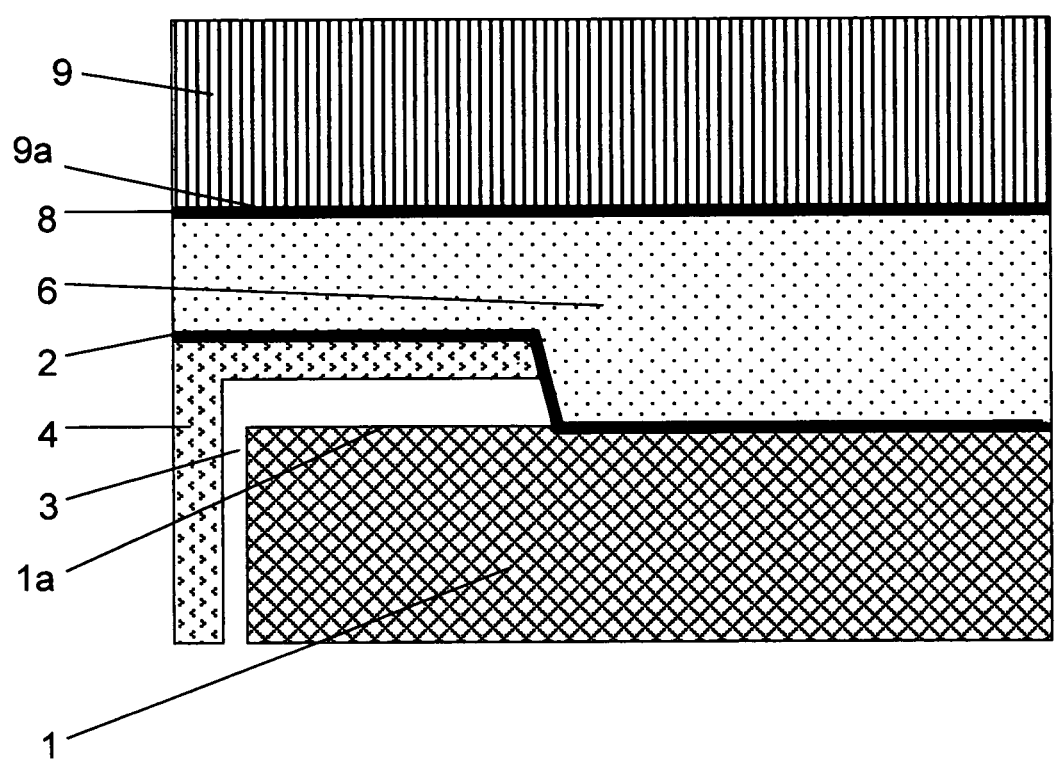
FIG. 4 is a cross sectional view of an illustrative embodiment of the present invention, which is similar to the embodiment shown in FIG. 1, except that the first pressure sensitive adhesive layer is configured such that it is interposed between the silicone bonding medium, and the underlying bezel and front side surface of the information display device.

Referring briefly to FIG. 4, where the optical PSA is embossed to conform to the topography of the display front, including the bezel, thereby providing the necessary seal between the bezel and the LCD surface and eliminating the requirement of a gasket between the two, an optical PSA may be applied in the form of the optical PSA on both sides of a polyester carrier, or may be deposited directly onto the display assembly in a layer sufficiently thick to provide the required seal.

With respect to the application of the silicone bonding medium, one method of bonding optical components with silicone is to apply a gasket of desired thickness around the perimeter of the device between the substrates, thereby forming a cavity, which is then injection filled with liquid silicone. Another method of bonding is achieved by dispensing a puddle of liquid silicone onto a substrate, with the thickness of the silicone bond controlled by spacers or other means, after which a second substrate is applied to the liquid puddle which compresses and spreads beyond the substrate edges. Masking is required to protect components from silicone overflow.

A liquid crystal display (LCD) is typically used as the information display device of the illustrative embodiments herein. The normal factory-provided LCD includes a metal bezel over and around the front surface of the display. The common mechanical form of an optical panel bonded to the front of a display attaches the panel to the bezel. Another form of attaching a panel is to bond it directly to the LCD, within the bezel opening. This can eliminate the need for a seal between the bezel and the LCD. High-reliability assemblies for critical applications, for example, avionics, military, and so on, often eliminate the OEM (original equipment manufacturer) bezel in favor of a bond directly between the cover panel and the LCD itself, with or without a bezel. Each of these assembly types benefit from the present invention.

FIG. 1 shows a cross-section of an information display device and an optical cover panel. The optical cover panel is shown bonded to the information display device using a layer of optical silicone bonding medium and two films of optical pressure-sensitive adhesive.

It is noted that adhesion of an optical silicone bonding medium to polymer plastic can be substantially improved by using a layer of optically clear, acrylic or acrylate pressure-sensitive adhesive ("PSA") film. The PSA layer adheres with excellent strength to both the polymer plastic and to the optical silicone bonding medium.

A process in accordance with the present invention is described in conjunction with FIG. 1. More particularly, a front side surface 1a of information display device 1 is prepared with the application of optical pressure sensitive film 2, and air gap 3 between the front side surface of information display device 1 and bezel 4 is sealed with gasket seal 5. Subsequently, a layer of sufficiently pliable liquid state optical silicone bonding medium 6 is applied over the surface of optical PSA film 2.

Next, a back side surface of optical cover panel 9a, which has been prepared with attachment of optical PSA film 8, is placed onto the layer of liquid state optical silicone bonding medium 6. Optical silicone bonding medium 6 when applied in a liquid state is applied in sufficient quantity so as to provide for a minimum thickness of the optical silicone bonding medium 6 in its final, or cured state, so as to provide a necessary minimum thickness sufficient to provide the impact absorbing and stress absorbing properties of the optical silicone bonding medium. The minimum thickness of optical silicone bonding medium 6 is controlled by positioning of optical cover panel 9 relative to front side surface 1a by placement of shims or gaskets upon bezel 4 or by other common industrial positioning means.

To prevent optical silicone bonding medium 6 in its liquid state from contaminating information display device 1 by flowing through air gap 3 between front side surface 1a and bezel 4, gasket seal 5 is placed between front side surface 1a and bezel 4 prior to application of optical silicone bonding medium 6.

To summarize, optical pressure sensitive adhesive film 2 has been applied to the front side surface 1a. Optical pressure sensitive adhesive film 8 has been applied to back surface 9a of an optical cover panel 9. Gasket seal 5 has been placed between front side surface 1a and bezel 4. Optical silicone bonding medium 6 is applied in liquid form to attach optical cover panel 9 and optical PSA film 8 to optical PSA film 2, which is attached to information display device 1 and to bezel 4.

An alternative embodiment of the present invention is similar to that shown in FIG. 1, but excludes attachment of optical silicone bond layer 6 to bezel 4 which surrounds the information display device.

Another alternative embodiment, not illustrated, includes the features of FIG. 1, but does not require gasket seal 5 between front side surface 1a and bezel 4, in the circumstance when the optical silicone bonding medium in its liquid state is sufficiently viscous and air gap 3 between front side 1a and bezel 4 is sufficiently narrow that optical silicone bonding medium 6, while in liquid state, will not migrate through air gap 3 to contaminate information display device 1.

Another alternative embodiment includes the features of FIG. 1, but does not include attachment of optical pressure sensitive adhesive film 8 to back surface 9a of optical cover panel 9.

Another alternative embodiment includes the features of FIG. 1, but excludes bezel 4 surrounding information display device 1, air gap 3, and gasket seal 5.

Figure 2:
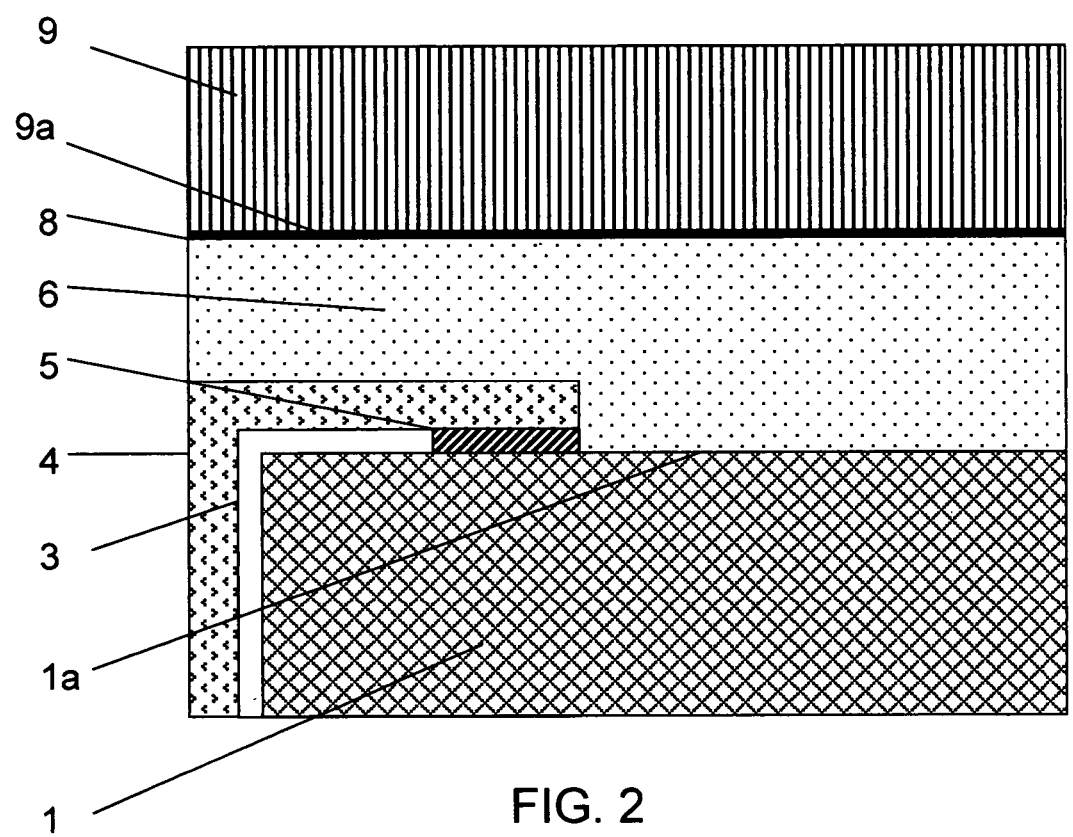
FIG. 2 is a cross sectional view of an illustrative embodiment of the present invention, which is similar to the embodiment shown in FIG. 1, but which excludes the first pressure sensitive adhesive layer.

Referring to FIG. 2, an information display device and an optical cover panel, assembled in accordance with the present invention, are shown. The optical cover panel is shown bonded to the information display device using a layer of optical silicone bonding medium and a film of optical pressure-sensitive adhesive.

Gasket seal 5 is placed between bezel 4 and front side surface 1a. A layer of sufficiently pliable liquid state optical silicone bonding medium 6 is applied over the front side surface 1a.

The back side surface of the optical cover panel 9a, prepared with attachment of optical PSA film 8, is placed onto the layer of liquid state optical silicone bonding medium 6, The optical silicone bonding medium 6 when applied in a liquid state is applied in sufficient quantity so as to provide for a minimum thickness of the optical silicone bonding medium 6 in its final, or cured state, so as to provide a necessary minimum thickness sufficient to provide the impact absorbing and stress absorbing properties of the optical bonding medium. The minimum thickness of the optical silicone bonding medium 6 is controlled by positioning of the optical cover panel 9 relative to the front side surface of the information display device 1a by placement of shims or gasket upon the bezel 4 or by other common industrial positioning means.

To prevent the optical silicone bonding medium 6 in its liquid state from contaminating the information display device 1 by flowing through the air gap 3 between the front side surface of the information display device 1a and the bezel 4, a gasket seal 5 has been placed between the front side surface of the information display device 1a and the bezel 4 prior to application of the optical silicone bonding medium 6.

Optical pressure sensitive adhesive film 8 has been applied to the back surface 9a of an optical cover panel 9. A gasket seal 5 has been placed between the front side surface of the information display device 1a and the bezel 4. Optical silicone bonding medium 6 is applied in liquid form to attach the optical cover panel 9 and optical PSA film 8 to the front surface of the information display device 1a and to the bezel 4.

An alternative embodiment of the present invention, not illustrated, includes the features of FIG. 2 but excludes attachment of the optical bonding medium 6 to the display bezel 4.

Another alternative embodiment of the present invention, not illustrated, includes the features of FIG. 2, but excludes the display bezel 4, the air gap between the bezel 4 and the front side surface of the information display device 1a, and the gasket seal 5.

Another alternative embodiment of the present invention as described in FIG. 2 includes the features as described in FIG. 2, but the process of manufacture provides the application of the optical silicone bonding medium 6 in its liquid state to the optical pressure sensitive adhesive film 8 which faces up, whereafter the inverted information display device 1 is lowered upon the optical silicone bonding medium with the front side surface 1a faces downward toward the optical PSA film 8 and the optical cover panel 9 to which the optical PSA film 8 is attached.

Figure 3:
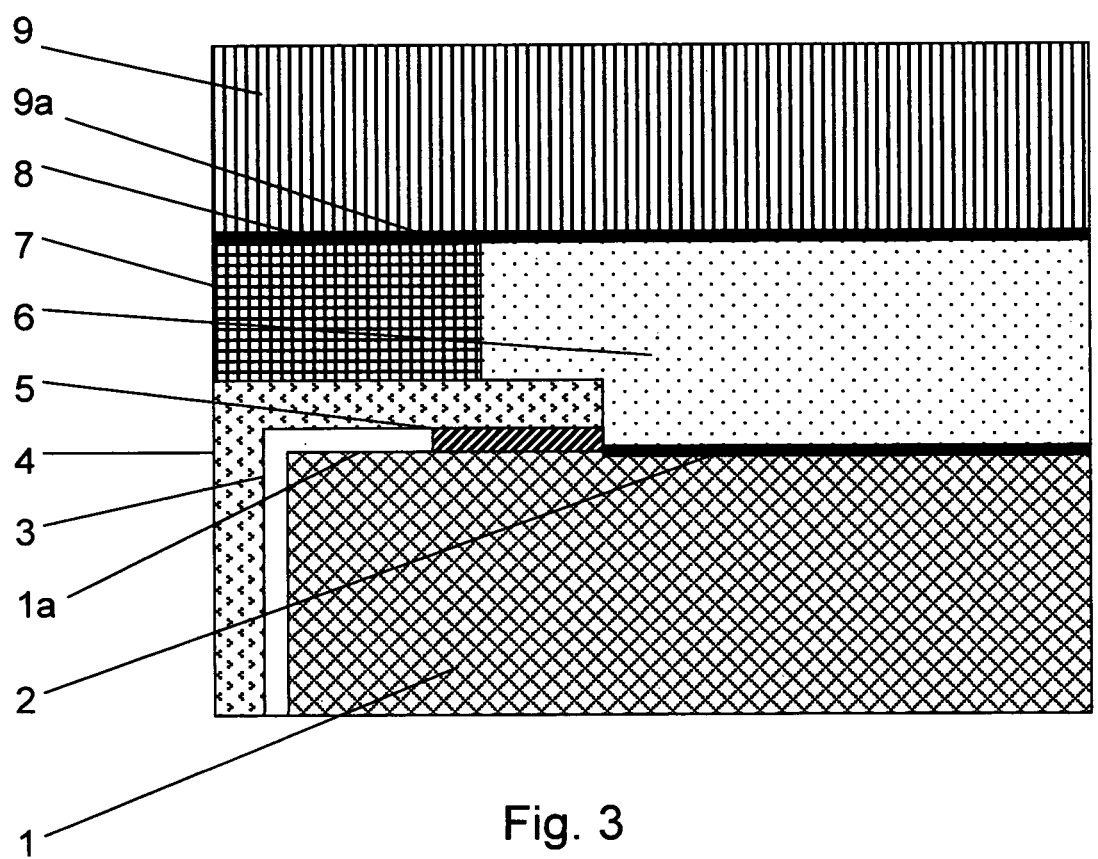
FIG. 3 is a cross sectional view of an illustrative embodiment of the present invention, which is similar to the embodiment shown in FIG. 1, but which includes a gasket disposed between the second pressure sensitive adhesive layer and a bezel.

FIG. 3 shows an information display device and an optical cover panel bonded in accordance with the present invention. More particularly, the optical cover panel is shown bonded to the information display device using a layer of optical silicone bonding medium and a film of optical pressure-sensitive adhesive film.

Optical pressure sensitive film 2 has been applied to the front side surface 1a of the information display device 1. A gasket seal 5 is placed between the bezel 4 and the front side surface of the information display device. The back side surface of the optical cover panel 9a is prepared with attachment of optical PSA film 8.

Gasket 7 provides a perimeter seal joining bezel 4 and back side surface of the optical cover panel 9a. The assembly is positioned vertically or tipped diagonally. One or more breeches are made through the top side of gasket 7 to permit injection of the optical silicone bonding medium in its liquid state. The optical silicone bonding medium in its cured state should be sufficiently pliable to provide impact absorbing and stress absorbing properties. One or more breeches are made through the top side of gasket 7 to permit displaced air to egress from the cavity formed between optical cover panel 9 and information display device 1 and bounded by gasket 7.

FIG. 4 shows another illustrative embodiment of the present invention in which an information display device and an optical cover panel are assembled with a combination of silicone bonding medium and pressure sensitive adhesive material. The optical cover panel is shown bonded to the information display device using a layer of optical silicone bonding medium and a film of optical pressure-sensitive adhesive.

Optical pressure sensitive adhesive film 2 that attaches to the information display device is formed or embossed such that optical PSA film 2 matches the contours of information display device 1 including bezel 4 that typically surrounds the information display device. The embossed optical PSA film 2 serves a second function in that this film prevents optical silicone bonding medium 6 from seeping under bezel 4 into air gap 3.

After optical PSA film 2 has been adhered to front surface 1a and bezel 4, a layer of sufficiently pliable liquid optical silicone bonding medium 6 is applied over the surface of optical PSA film 2. It is noted that this embodiment allows for the application of liquid optical silicone bonding medium 6 without the requirement of a gasket seal between front side surface 1a and bezel 4, or the aid of complex manufacturing techniques such as vacuum chambers or pressure injection of the bonding medium, disassembly of the display assembly to install a seal, or inversion of the assembly during the manufacturing process to prevent optical silicone bonding medium 6 in its liquid state from entering air gap 3.

Optical cover panel 9, prepared with attached optical PSA film 8 to back side optical cover panel 9a, is placed onto the layer of liquid state optical silicone bonding medium 6. A minimum thickness of optical silicone bonding medium 6 must be maintained in order to provide the impact absorbing and stress absorbing properties of optical silicone bonding medium 6. The minimum thickness of optical silicone bonding medium 6 is controlled by positioning of optical cover panel 9 relative to the front side surface 1a by placement of shims or gaskets on bezel 4, or by other common industrial positioning means.

An alternative embodiment to that shown in FIG. 4, excludes bezel 4, air gap 3, and gasket 5. A gasket 7 attaches optical cover panel 9 directly to front side surface 1a.

Another embodiment of the present invention shown in FIG. 4 includes the features described, but excludes bezel 4, air gap 3, and gasket 5. The gasket 7 attaches optical cover panel 9 directly to optical pressure sensitive adhesive film 2.

The application of the present invention involves application of an acrylic or acrylate or other type optical pressure sensitive adhesive (or PSA, also referred to as a "transfer adhesive") to polymer plastic surfaces. The optical PSA film may be applied in the form of adhesive film sheet with protective liner, in the manner of laminating other films with rollers or squeegees. The optical PSA film also may be applied by spray or other deposition manner directly upon the polymer surfaces.

Trapped pockets of air between the PSAs and attached surfaces are to be prevented in application process or eliminated by vacuum or other means.

In the construction of an information display device, such as an LCD, incorporating an optically bonded cover, liquid state optical silicone bonding medium is used in a layer of sufficient thickness and softness to allow flexibility. Optical silicones, such as platinum cure silicones, may require mixing of components and removal of air bubbles from the mixture prior to use. Gaskets are sometimes used to provide bond thickness, and other methods such as the use of Teflon shims or mechanical holding devices may be used.

The optical silicone bonding medium in its liquid, uncured state, is applied to the surfaces to be bonded. The optical PSA film; exposed by removal of any protective liner, provides a superior adhesion surface. The liquid is permitted to cure to an elastic state.

Gasket components may be of die-cut adhesive sheets, adhesive strips, or formed with RTV or other paste which cures to a pliable solid.

Conclusion

Various embodiments of the present invention provide advantages over conventional arrangements, including but not limited to, reduction of de-lamination under mechanical or temperature stresses. The optical bond in various embodiments of the present invention remains flexible and acts as an impact absorber protecting the information display device from mechanical shock and temperature changes; is optically-stable (i.e., non-yellowing); adheres well to polymer plastic; and eliminates the air gap between the information display device and the optical cover plate thus eliminating moisture condensation and optical reflections between the display device and the optical cover panel.

Various embodiments of the present invention are suitable for bonding a rigid optical polymer plastic cover plate to an information display device in order to provide protection to and improve the visual appearance of the information display device. Various embodiments of the invention provide improved adhesion of optical silicone bonding media to the front polarizer film surface of a liquid crystal display, also a polymer, typically in the form of cellulose triacetate (TAC). Another benefit of using the present high strength bond is that optical silicone is sufficiently elastic to absorb differences in coefficients of thermal expansion of the bonded materials thereby preventing irregularities in the display image caused by stresses imparted by thermal changes. Further, the high-strength optical bond will not degrade over time or fail under conditions of mechanical shock, exposure to moisture, temperature changes or atmospheric pressure changes, while being simple to manufacture and using low-cost materials.

Applications using the high-strength optical bond are not limited to information display devices. The optical bonding medium is not limited to silicone and may include other optical bonding media. The pressure sensitive adhesive composition may be other than acrylic or an acrylate. The optical cover panel is not limited to plastic substance but may also be of other optical materials.

Alternative embodiments may be constructed without a bezel.

It is to be understood that the present invention is not limited to the embodiments described above, but encompasses any and all embodiments within the scope of the subjoined Claims and their equivalents.

APPENDIX 1 information display device
1a front side surface of the information display device (1)

2 optical pressure sensitive adhesive (PSA) film
3 air gap between the front side surface of the information display device (1a) and the bezel (4)
4 bezel (which surrounds the information display device)
5 gasket seal between the front side surface of the information display device (1a) and bezel (4)
6 optical silicone bonding medium
7 gasket between the bezel (4) and the back surface of the rigid optical cover panel (9)
8 optical pressure-sensitive adhesive (PSA) film
9a back side surface of optical cover panel (9)
9 optical cover panel

What is claimed is:

1. An assembly, comprising:
an information display device;
a protective cover mechanically coupled to, and spaced apart from, the information display device;
a bezel disposed in a predetermined spatial relationship to the information display device, the bezel having at least a first portion thereof separated from the information display device by an air gap, the first portion of the bezel being disposed intermediate the information display device and the protective cover;
a layer of silicone bonding material disposed between the information display device and the protective cover; and
a first pressure sensitive adhesive film disposed between the information display device and the protective cover, the first pressure sensitive adhesive film bonded to a first major surface of the layer of silicone bonding material, the first pressure sensitive adhesive film being disposed such that it blocks the air gap between first portion of the bezel and the information display device.

2. The assembly of claim 1, wherein the protective cover comprises a material selected from the group consisting of polymer plastic and glass.

3. The assembly of claim 1, wherein the information display device comprises a liquid crystal display (LCD) device.

4. The assembly of claim 1, wherein the silicone bonding material is selected from the group consisting of platinum-catalyzed silicone, addition-cured elastomers, vinyl-terminated siloxanes, polymethylsiloxane, and polydimethylsiloxane.

5. The assembly of claim 1, wherein the pressure sensitive adhesive film is optically transparent.

6. The assembly of claim 1, wherein the pressure sensitive adhesive film is dyed so as to function as a band pass filter.

7. The assembly of claim 1, wherein the pressure sensitive adhesive film is dyed so as to function as a neutral density filter.

8. The assembly of claim 1, wherein the pressure sensitive adhesive layer is adapted to provide viscoelastic bonds.

9. The assembly of claim 1, wherein the first pressure sensitive film is disposed such that it is in contact with the protective cover and with the silicone bonding material.

10. The assembly of claim 1, further comprising a second pressure sensitive film disposed between the information display device and the protective cover, the second pressure sensitive adhesive film bonded to a second major surface of the layer of silicone bonding material.

11. The assembly of claim 10, further comprising a second pressure sensitive film disposed between the information display device and the protective cover, the second pressure sensitive adhesive film disposed such that it is in contact with the information display device and the silicone bonding material.

* * * * *